L. A. MAURER.
CLUTCH MECHANISM.
APPLICATION FILED DEC. 15, 1911.

1,032,759.

Patented July 16, 1912.

WITNESSES:
M. A. Johnson
W. E. Morton

INVENTOR
Louis A. Maurer,
BY
Wm. H. Canfield
ATTORNEY

UNITED STATES PATENT OFFICE.

LOUIS A. MAURER, OF NEWARK, NEW JERSEY.

CLUTCH MECHANISM.

1,032,759.  Specification of Letters Patent.  Patented July 16, 1912.

Application filed December 15, 1911. Serial No. 665,987.

*To all whom it may concern:*

Be it known that I, LOUIS A. MAURER, a citizen of the United States, residing at Newark, in the county of Essex and State of New Jersey, have invented certain new and useful Improvements in Clutch Mechanisms; and I do hereby declare the following to be a full, clear, and exact description of the invention, such as will enable others skilled in the art to which it appertains to make and use the same, reference being had to the accompanying drawing, and to figures of reference marked thereon, which form a part of this specification.

This invention relates to an improved clutch mechanism, and is designed to provide a clutch that is noiseless in its operation, is prompt in its response to its operating mechanism, and it provides for the engagement between the parts that are adapted to be operatively connected so that this engagement takes place without shock.

The invention comprises a shaft with a distorted portion, that is, a portion that is not round, and on this distorted portion are arranged two bushings or similar split elements which are forced apart when slightly rotated on the distorted portion of the shaft, and when they are thus spread they are forced into recesses in the pulley so that the whole device is rotated together, it being understood that other rotating elements can be used with the clutch instead of a pulley.

The invention also consists of a stop mechanism which is engaged by the split bushing of the device so that this bushing is stopped, and the recessed portion of the pulley into which the bushing was seated then acts with a cam action to force the halves together on the distorted portion of the shaft, and the pulley is then disconnected from the shaft and again idly rotates. The stop device is used as a starting mechanism also.

The invention is illustrated in the accompanying drawing, in which—

Figure 1:
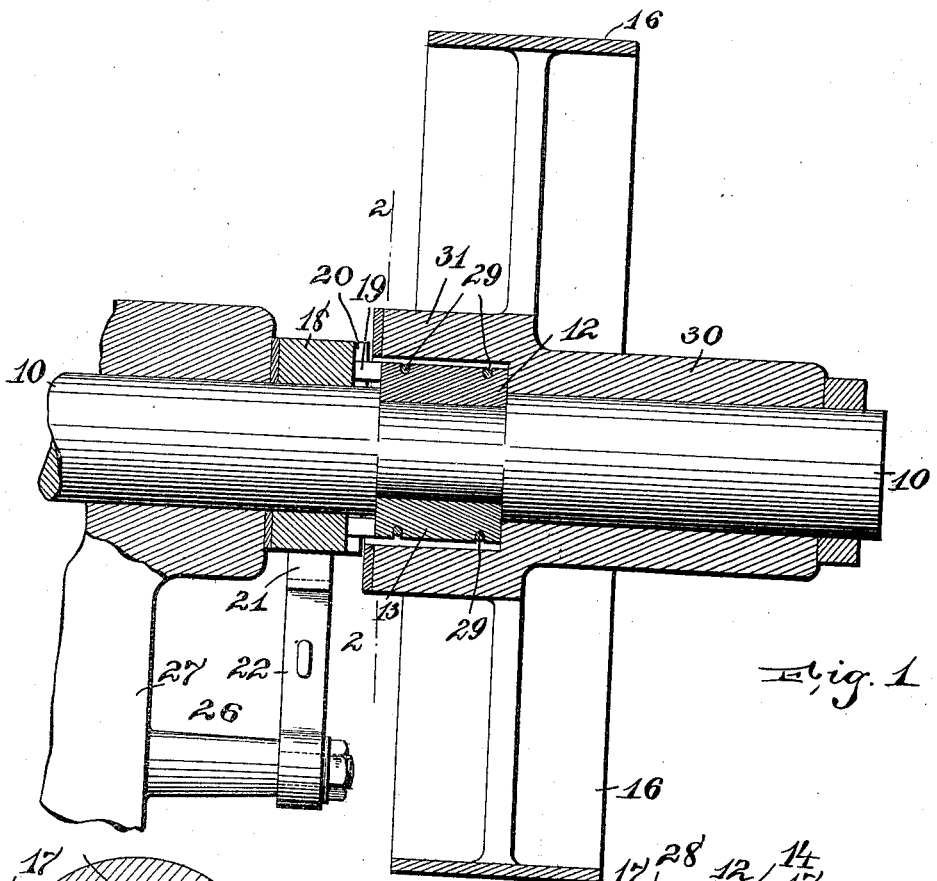
Figures 2, 3:
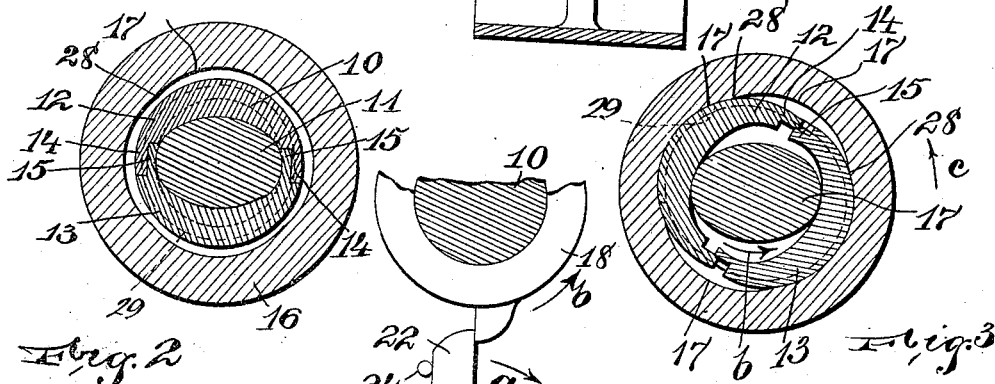
Figure 4:
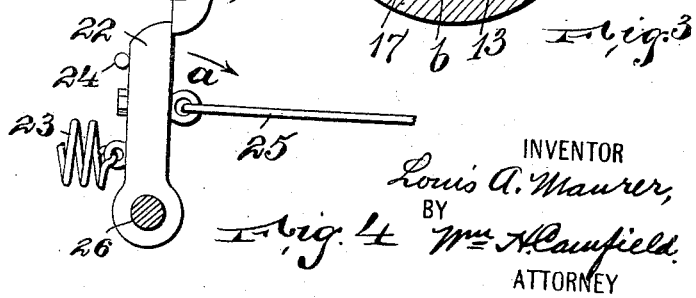

Figure 1 is a sectional view of the device with the stop-piece shown in elevation. Fig. 2 is a section on line 2, 2, in Fig. 1 showing the mechanism in the position in which it is when the parts are disconnected, that is, when the pulley is running idle. Fig. 3 is a view similar to Fig. 2, but showing the bushing turned on the distorted portion of the shaft so as to spread the parts of the bushing into engagement with the pulley. Fig. 4 is a detail view showing the starting and stopping mechanism.

The shaft 10, which may be the shaft of any mechanism which it is adapted to operate, such as for instance a power press, has a distorted portion which is preferably made elliptical as at 11, although I do not wish to be understood as limiting myself to an elliptical outline in cross section. For the purposes, however, of this specification and claims, the distorted portion will be called the elliptical portion having a long and a short axis. A split bushing surrounds the distorted or elliptical portion of the shaft, the split bushing consisting of two members 12 and 13 which are formed on the inside to fit the elliptical portion of the shaft as shown in Fig. 2, this permitting the two members 12 and 13 of the split bushing to closely embrace the elliptical portion 11 and rest tightly against the shaft.

I prefer to provide the members 12 and 13 with the flanges 14 and 15 which overlap and insure the registration of the members 12 and 13 even when they are separated as shown in Fig. 3. The exterior of the split bushings is preferably made round, the split bushing fitting in a recess in the pulley 16, the recess being provided with portions as 17 which are eccentric to the outside of the split bushing when the split bushing is in its closed position. These eccentrically recessed portions form seats into which the split bushing members are forced by the elliptical portion of the shaft. The split bushings are provided with an operative connection with a collar 18, the operative connection that is illustrated being the pins 19 which project into the slot 20 of the collar 18. On the collar 18 is a finger 21 which is engaged by a trigger 22, which trigger is normally held back by a spring 23 against a pin 24 and is pulled against the action of the spring by a suitable connection 25 which is operated from a hand lever, treadle or any other means for manipulating it. The trigger is mounted to swing on a suitable pin 26 fastened to the machine frame or other support 27.

The operation of the device is as follows:—Assuming that this machine is at rest, and the pulley 16 is operated by a belt and thus idly runs on the shaft 10, it is desired to start the machine for one revolution of the shaft 10, the trigger 22 is pulled forward in the direction of the arrow *a* in Fig. 4 by means of the connection 25. The trigger thus pushes the finger 21 in the direction of the arrow *b* shown in Figs. 3 and 4, the shaft being at rest. The elliptical inner faces of the split bushing members are swung toward the long axis of the elliptical portion of the shaft and are spread, that is, they are forced apart and then moved in the direction opposite to the direction of rotation of the pulley 16 which is indicated by the arrow *c* in Fig. 3, and are quickly seated in the opposed recesses 17 of the pulley. The two members 12 and 13 thus act as keys in these recesses and are rotated with the pulley, and, by their contact with the elliptical portion of the shaft, take the shaft with them and all the elements are rotating together. In the meantime the trigger 22 has snapped back against the pin 24, and when the finger 21 has made one revolution, it strikes the trigger 22 and thus stops the collar 18 which, through the operative connection with the members 12 and 13, halts the members. The pulley continues to rotate, and the recesses 17 being eccentric and also the projections 28 where the recesses merge, have a cam action tending to squeeze the members 12 and 13 toward each other, the members thus being forced back to the position shown in Fig. 2, around the distorted or elliptical portion of the shaft, these members when thus forced together also acting as a brake and halting the shaft in the position it was when it was started, that is, all the parts are in normal position shown in Fig. 2.

I prefer to insure the closing of the members 12 and 13 by embracing them with a pair of springs 29 which can be placed in grooves in the members as shown in Fig. 1. These springs are in the shape of split rings, but other means for forcing the members together can be employed.

The preferred form of pulley comprises a long hub 30 which fits over the shaft 10 and rotates freely thereon and has the overhanging portion 31 which is recessed to receive the members 12 and 13, as will be evident from Fig. 1. The long hub 30 steadies the pulley on the shaft and insures the registration of the pulley with the members 12 and 13.

Having thus described my invention, what I claim is:—

1. A clutch mechanism comprising a shaft having a distorted portion thereon, a split bushing on the distorted portion and rotatably arranged thereon, a rotating element on the shaft and having recesses into which the members of the split bushing are adapted to be forced when the split bushing is partially rotated, and means for rotating the split bushings to cause them to enter the recesses in the rotating element while they engage the distorted portion of the shaft.

2. A clutch mechanism comprising a shaft having an elliptical portion thereon, split bushings with their inner faces adapted to fit the elliptical portion of the shaft, a pulley on the shaft having recesses into which the split bushing members are adapted to be forced when they are partially rotated on the elliptical portion, means for rotating the bushings on the shaft whereby they are spread into the recesses of the pulley, and means for engaging the split bushings to stop them, the walls of the recesses of the pulley acting to force the members toward each other when they are halted.

3. A clutch mechanism comprising a shaft with an elliptical portion thereon, a pulley having eccentric recesses therein surrounding the elliptical portion of the shaft, the split bushings on the elliptical portion of the shaft having their inner faces adapted to engage the elliptical portion of the shaft, and having their outer faces normally out of contact with the recesses of the pulley but being adapted to be seated in said recesses when the members are partially rotated on the elliptical portion of the shaft, means for rotating the members to cause them to be spread by the elliptical portion of the shaft, and means for stopping the split bushings in their rotation, the walls of the recesses acting to force the members toward each other when they are halted, the inner faces of the members when pressed together acting to lock the shaft against rotation.

4. A clutch mechanism comprising a shaft having an elliptical portion thereon, a pair of members forming a split bushing, the members having overlapping flanges to insure the rotation of the members when they are slightly separated, a pulley mounted to rotate on the shaft having recesses into which the outer faces of the members are adapted to be seated to lock the pulley to the shaft to insure their rotation together, means for rotating the members in a direction opposite to the direction of the rotation of the pulley, and a stop adapted to halt the members when rotated by the pulley whereby the continued rotation of the pulley causes the walls of its recesses to force the members toward each other and out of engagement with the pulley.

5. A clutch mechanism comprising a shaft having an elliptical portion, a pair of members with their elliptical inner faces adapted to fit the elliptical portion of the shaft, the members being separable and having overlapping flanges to insure their rotating together when slightly separated, a pulley rotating on the shaft, the pulley having recesses surrounding the members and into which the members can be seated, the members being forced into the recesses when said members are rotated on the shaft, a collar, a finger on the collar, an operative connection between the collar and the members, a trigger, means for normally holding the trigger in normal position, a stop for the trigger, and means for operating the trigger to move the finger whereby the collar and the members are turned in a direction opposite to the rotation of the pulley, the trigger passing beyond the finger when the members engage the recesses of the pulley.

In testimony, that I claim the foregoing, I have hereunto set my hand this 14th day of December, 1911.

LOUIS A. MAURER.

Witnesses:
 CHARLES ERICSON,
 ALLAN ORD.

Copies of this patent may be obtained for five cents each, by addressing the "Commissioner of Patents, Washington, D. C."